United States Patent [19]

Chiba

[11] 4,341,414
[45] Jul. 27, 1982

[54] BACK DOOR STAY ARRANGEMENT

[75] Inventor: Tatsuya Chiba, Yokosuka, Japan

[73] Assignee: Nissan Motor Company, Limited, Kanagawa, Japan

[21] Appl. No.: 82,931

[22] Filed: Oct. 9, 1979

[30] Foreign Application Priority Data

Oct. 11, 1978 [JP] Japan .................. 53-139510[U]

[51] Int. Cl.³ .............................................. B62D 25/10
[52] U.S. Cl. ........................................ 296/56; 49/386; 296/146
[58] Field of Search ............... 296/146, 56, 57 A, 195, 296/202; 49/386, 402

[56] References Cited

U.S. PATENT DOCUMENTS

| | | | |
|---|---|---|---|
| 2,769,659 | 11/1956 | Perry et al. | 49/386 |
| 2,779,069 | 1/1957 | Ziesmer | 49/386 |
| 3,389,502 | 6/1968 | Leurent | 49/402 |
| 3,851,867 | 12/1974 | Fricko | 296/56 |

FOREIGN PATENT DOCUMENTS

| | | | |
|---|---|---|---|
| 7027856 | 7/1970 | Fed. Rep. of Germany | |
| 2226134 | 12/1973 | Fed. Rep. of Germany | 296/146 |
| 97861 | 5/1973 | Fed. Rep. of Germany | |
| 2005199 | 4/1979 | United Kingdom | 296/56 |

OTHER PUBLICATIONS

Research Disclosure No. 101, Sep. 1972, pp. 63 and 64, #10140.

Primary Examiner—Joseph F. Peters, Jr.
Assistant Examiner—Ross Weaver

[57] ABSTRACT

A back door stay arrangement for an automotive vehicle including an opening formed at the back of the automotive vehicle, comprising a back door hinged at its upper portion to the upper edge portion of said opening so that said back door can be opened or closed; a back door stay fitted between a side edge portion of said opening and said back door for the purpose of supporting said back door; a weather strip adapted to seal said opening with said back door when said back door is closed; a stepped portion formed on the inner portion of said side edge portion of said opening inside of the sealing point of said weather strip in such a way that said stepped portion can cover said back door stay, one end of said back door stay being provided on said stepped portion; and a barrier embossed in a convex form on the inner side of said back door at a position corresponding to said stepped portion, the other end of said back door stay being provided on said barrier; whereby said back door stay can be placed in a space defined by said stepped portion and said barrier when said back door is closed.

9 Claims, 7 Drawing Figures

BACK DOOR STAY ARRANGEMENT

BACKGROUND OF THE INVENTION

The present invention relates to a back door stay arrangement of a automotive vehicle.

FIG. 1 shows a prior art back door of a van type automotive vehicle. The back opening 1 is formed on the back of the vehicle body where the back door 3 is hinged at the top portion thereof to the top portion of the back of the vehicle body by the hinge means 2. The back door stay 4, which is often of a gas strut type, is arranged between the back door 3 and the vehicle body so as to hold the back door 3 open if desired.

FIG. 2 shows a prior art arrangement of the back door stay 4. The weather strip 6 is fixed onto the flange portion 5 of the back opening portion 1 for the purpose of sealing the opening portion 1 with the back door 3 when the back door 3 is closed. The outer panel 7 is embossed to form the stepped portion 8. The inner panel 9 of the back door 3 is embossed to form the weather strip seat 10. The back door stay 4 is placed in the space 11 defined by the stepped portion 8 of the outer panel 7 and the weather strip seat 10 and its following portion of the back door inner panel 9. However, in such an arrangement of the back door stay 4, the back door stay 4 is positioned outside of the sealing portion between the weather strip 6 and the seat 10. Therefore, water or dust can easily enter the space 11 from the clearance 12 between the outer edge of the opening portion 1 and the side edge of the back door 3 thereby coming to rest on the surface of the back door stay 4. Thus, it is necessary that the back door stay be subjected to a rust-preventive treatment and a surface treatment for preventing the adhesion of dust or the like. Such steps increase the production cost of the back door stay 4.

FIG. 3 shows another prior art arrangement of the back door stay 4. The weather strip 6 is fixed on the flange 5 of the opening portion 1 for the purpose of sealing the opening portion 1 with the back door 3 by having the weather strip 6 contact the seat of the inner panel 9 of the back door 3. The back door stay 4 is placed inside of the sealing portion between the weather strip 6 and its seat when the back door is closed. In such an arrangement, the back door stay 4 is apt to interfere with goods loaded inside the vehicle when the back door 3 is closed, or to be damaged by or damage cargo which moves back against the stay when the vehicle is in motion. In order to avoid such damage to the cargo or back door stay 4, the back door stay 4 must be stronger than the supporting rigidity for the back door 3. This results in an excessive cost. In addition, the appearance is adversely affected because the back door stay 4 can be seen from the inside and outside of the vehicle.

SUMMARY OF THE INVENTION

Accordingly, it is an object of the present invention to provide a back door stay arrangement wherein the back door stay does not interfere with cargo loaded in the automotive vehicle.

It is another object of the present invention to provide a back door stay arrangement wherein the back door stay may be sealed when the back door is closed.

It is a further object of the present invention to provide a back door stay arrangement wherein the back door stay cannot be seen from the inside or outside of the vehicle.

According to the present invention, there is provided a back door stay arrangement for an automotive vehicle including an opening formed at the back of the automotive vehicle, comprising a back door hinged at its upper portion with the upper portion of said opening so that said back door can be opened or closed; a back door stay fitted between a side edge portion of said opening and said back door for supporting said back door; a weather strip adapted to seal said opening with said back door when said back door is closed; a stepped portion formed on the inner portion of said side edge portion of said opening inside of the sealing point of said weather strip in such a way that said stepped portion can cover said back door stay, one end of said back door stay being provided on said stepped portion; and a barrier embossed in a convex form on the inner side of said back door at a position corresponding to said stepped portion, the other end of said back door stay being provided on said barrier; whereby said back door stay can be placed in a space defined by said stepped portion and said barrier when said back door is closed.

BRIEF DESCRIPTION OF THE DRAWINGS

These and other objects, features and advantages of the present invention will become more apparent from the following description of the preferred embodiments thereof taken in conjunction with the accompanying drawings. A reference numeral designates a similar or corresponding part or member in all figures. In the drawings.

DESCRIPTION OF THE PREFERRED EMBODIMENTS

Figure 1:
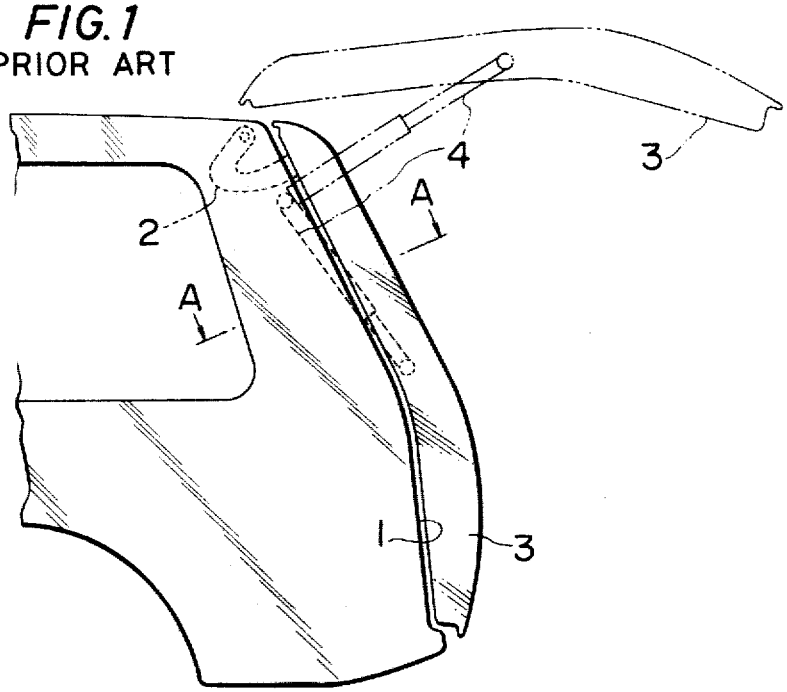
FIG. 1 is a schematic side view showing a back portion of a van type automotive vehicle.
Figure 2:
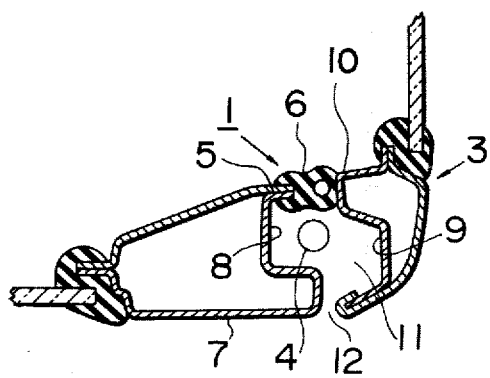
FIG. 2 is a sectional view taken along the line A—A of FIG. 1, showing a prior art back door stay arrangement.
Figure 3:
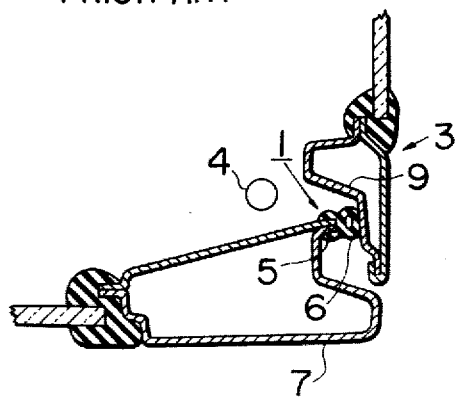
FIG. 3 is a sectional view of another prior art back door stay arrangement, corresponding to FIG. 2.
Figure 4:
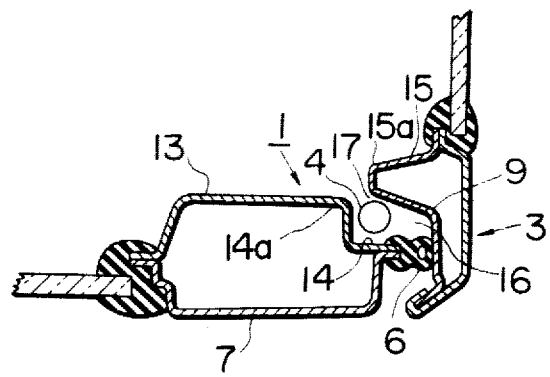
FIG. 4 is a sectional view showing a back door stay arrangement according to an embodiment of the present invention.

FIG. 4 shows a first embodiment of the present invention. The opening 1 is formed at the back of the van type automotive vehicle in a conventional manner. The back door 3 is attached at its upper portion onto the upper edge portion of the opening 1 by hinge means. The weather strip 6 is fixed on the joint portion between the inner panel 13 and the outer panel 7 so as to rest on the seat of the inner panel 9 of the back door 3 for the purpose of sealing when it is closed. The inner panel 13 is embossed at its edge portion to form the stepped portion 14 having a depth to cover half of the back door stay 4. The inner panel 9 is embossed at its portion corresponding to the stepped portion 14 to form the barrier portion 15 for the purpose of covering the other half of the back door stay 4. The back door stay 4 is located in the space 16 defined by the stepped portion 14 and the barrier 15 inside of the sealing point between the weather strip 6 and the seat of the inner panel 9 of the back door 3 when it is closed. One end of the back door stay 4 is pivoted on the side wall of the stepped portion 14 while the other end of the back door stay 4 is pivoted to the side wall of the barrier portion 15 of the back door 3. Thus the intermediate portion of the back door stay 4 is hidden by the stepped portion 14 and the barrier 15 when the back door 3 is closed. Also, because the back door stay 4 is placed inside of the space sealed by the weather strip 6, water or dust cannot enter the space 16 where the back door stay 4 is positioned.

Figure 5:
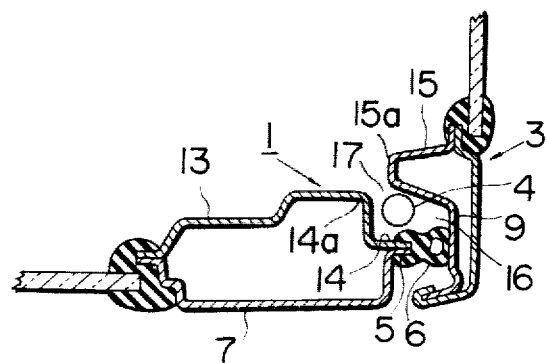
FIG. 5 is a sectional view showing another embodiment of the present invention, corresponding to FIG. 4.
Figure 6:
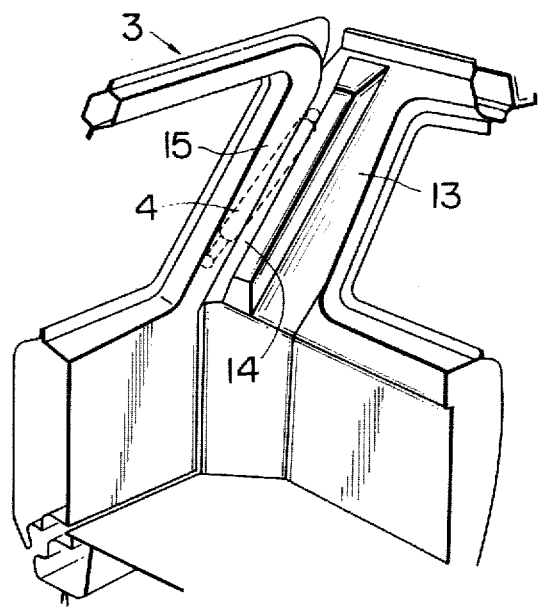
FIG. 6 is a perspective view of the back door stay arrangement as shown in FIG. 5 from the inside of the passanger room.

FIGS. 4 and 5 show another embodiment of the present invention. The inner panel 13 near the opening 1 is embossed in a convex form to form the stepped portion 14. One end of the back door stay 4 is pivoted on the side wall of the stepped portion 14 while the other end thereof is pivoted on the side wall of the barrier portion 15.

The top 15a of the convex barrier 15 is preferably designed to be positioned at its edge near the shoulder 14a of the stepped portion 14 so that the clearance 17 between the shoulder 14a of the stepped portion 14 and the top 15a of the barrier 15 can be made as narrow as possible when the back door 3 is closed, thereby hiding the back door stay 4 from the inside and outside of the vehicle.

Figure 7:
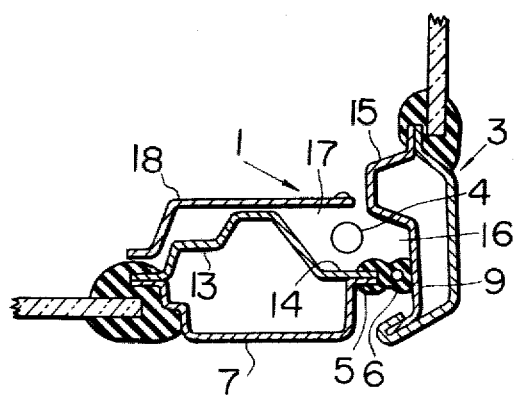
FIG. 7 is a sectional view showing a further embodiment of the present invention.

FIG. 7 shows a further embodiment of the present invention. The trimmer 18, which is usually fitted on the surface of the inner panel 13 of the vehicle body, may be designed to extend over the stepped portion 14 in case it is difficult to sufficiently emboss the inner panel 9 to form the barrier 15 due to reasons regarding the back door's appearance. When the back door 3 is closed, the back door stay 4 is hidden by the edge portion of the trimmer 18.

As can be seen from the foregoing, in all embodiments as noted above, the weather strip 6 is fixed on the flange portion 5 of the opening 1 formed at the joint point between the inner panel 13 and the outer panel 7 of the vehicle body. However, the weather strip can be provided on the back door 3. In such a case, a seat should be formed at an edge portion of the opening 1.

According to the present invention, the back door stay cannot be seen from the inside or outside of the vehicle when the back door is closed improving the appearance, because the back door stay is hidden by the stepped portion and the convex barrier. Also, the back door stay can be located in a space which is sealed against the elements because it is placed inside of the sealing point of the weather strip. Therefore, no treatment for preventing rusting of the back door stay or adhesion of dust thereto is required. In addition, the back door stay does not interfere with cargo loaded in the vehicle body. As a result, it is not necessary to strengthen the back door stay to protect it from loaded cargo and the cargo and back door stay do not damage each other.

What is claimed is:

1. A back door stay arrangement for an automotive vehicle having, an opening formed at the back of the automotive vehicle body, comprising:
    a back door hinged at its upper portion to the upper edge portion of said opening so that said back door can be opened or closed;
    a back door stay fitted between a side edge portion of said opening and said back door for the purpose of supporting said back door;
    a weather strip adapted to seal the periphery of said opening with the periphery of said back door outside said back door stay when said back door is closed;
    a stepped portion formed on the inner portion of said side edge portion of said opening inside of the sealing point of said weather strip in such a way that said stepped portion can cover one side of said back door stay, one end of said back door stay being provided on said stepped portion; and
    a barrier embossed in a convex shape, the barrier being formed on the inner side of said back door at a position corresponding to said stepped portion, the other end of said back door stay being provided on said barrier;
    the back door including an inner panel and an outer panel;
    the vehicle body including an inner panel and an outer panel at a rear portion thereof;
    the weather strip being fixed on the joint portion between the inner panel and the outer panel and resting on the seat of the inner panel of the back door when it is closed;
    whereby said back door stay can be placed in a space defined by said stepped portion and said barrier when said back door is closed, so that said back door stay can be covered by said stepped portion and said barrier.

2. A back door stay arrangement for an automotive vehicle as defined in claim 1 wherein said side edge portion of said opening includes an edge portion of an outer panel and an inner panel, said inner panel being partly embossed in a concave shape to form said stepped portion.

3. A back door stay arrangement for an automotive vehicle as defined in claim 1 wherein said side edge portion of said opening includes an edge portion of an outer panel and an inner panel, said inner panel being embossed in a convex shape to form said stepped portion.

4. A back door stay arrangement for an automotive vehicle as defined in any one of claims 1, 2 or 3 wherein said barrier has at its top portion an edge which can be positioned near a shoulder portion of said stepped portion when said back door is closed.

5. A back door stay arrangement for an automotive vehicle as defined in any one of claims 1 or 2 further comprising a trimmer provided on an inner panel of said automotive vehicle, said trimmer extending over said stepped portion so as to hide said back door stay when said back door is closed.

6. A back door stay for an automotive vehicle, comprising:
    a vehicle body having at its back portion a back opening;
    a back door adapted to close the back opening of the vehicle body, the upper edge of the back door being hinged to the upper edge of the back opening of the vehicle body in such a manner that the back door can rotate in respect to the back opening of the vehicle body;
    a weather strip for sealing the periphery of the back opening with the periphery of the back door when the back door is closed;
    a back door stay placed between a side of the back opening of the vehicle body and a side of the back door for supporting back door in position when the back door is opened;

the back door stay being located inside of the sealing point of the weather strip;

the vehicle body including an inner panel and an outer panel;

a stepped portion formed on the inner panel of the vehicle body at the rear edge portion thereof adjacent to the weather strip by embossing the inner panel, the stepped portion having a depth to cover half of the back door stay;

the back door including an inner panel and an outer panel;

a barrier portion formed on the inner panel of the back door for covering the other half of the back door stay by embossing the inner panel of the back door at a position corresponding to the stepped portion of the inner panel of the vehicle body so that the stepped portion of the vehicle body can face the barrier portion of the back door;

the weather strip being fixed on the joint portion between the inner panel and the outer panel so as to rest on the seat of the inner panel of the back door for the purpose of sealing when it is closed;

the back door stay being placed in a space defined by the weather strip, the stepped portion of the inner panel of the vehicle body and the barrier portion of the inner panel of the back door in such a manner that the back door stay can be hidden by the stepped portion of the inner panel of the vehicle body and the barrier portion of the inner panel of the back door when the back door is closed.

7. A back door stay arrangement of claim 6, wherein one end of the back stay is pivoted on a side wall of the stepped portion of the vehicle body while the other end of the back door stay is pivoted to a side wall of the barrier portion of the back door.

8. A back door stay arrangement of claim 6, wherein the top shoulder of the stepped portion of the inner panel of the vehicle body is positioned near the top of the barrier portion of the inner panel of the back door when the back door is closed.

9. A back door stay arrangement of claim 6, further comprising a trimmer extending over the stepped portion of the inner panel of the vehicle body in such a way that the trimmer can hide the back door stay when the back door is closed.

* * * * *